June 9, 1931.　　　M. G. DE SIMONE　　　1,809,811
CALCULATING MACHINE
Filed May 26, 1925　　5 Sheets-Sheet 1

INVENTOR,
Michele G. de Simone,
BY
Henry J. Luecke,
ATTORNEY.

June 9, 1931.　　　M. G. DE SIMONE　　　1,809,811
CALCULATING MACHINE
Filed May 26, 1925　　　5 Sheets-Sheet 2

INVENTOR,
Michele G. de Simone,
BY
Henry J. Luche
ATTORNEY.

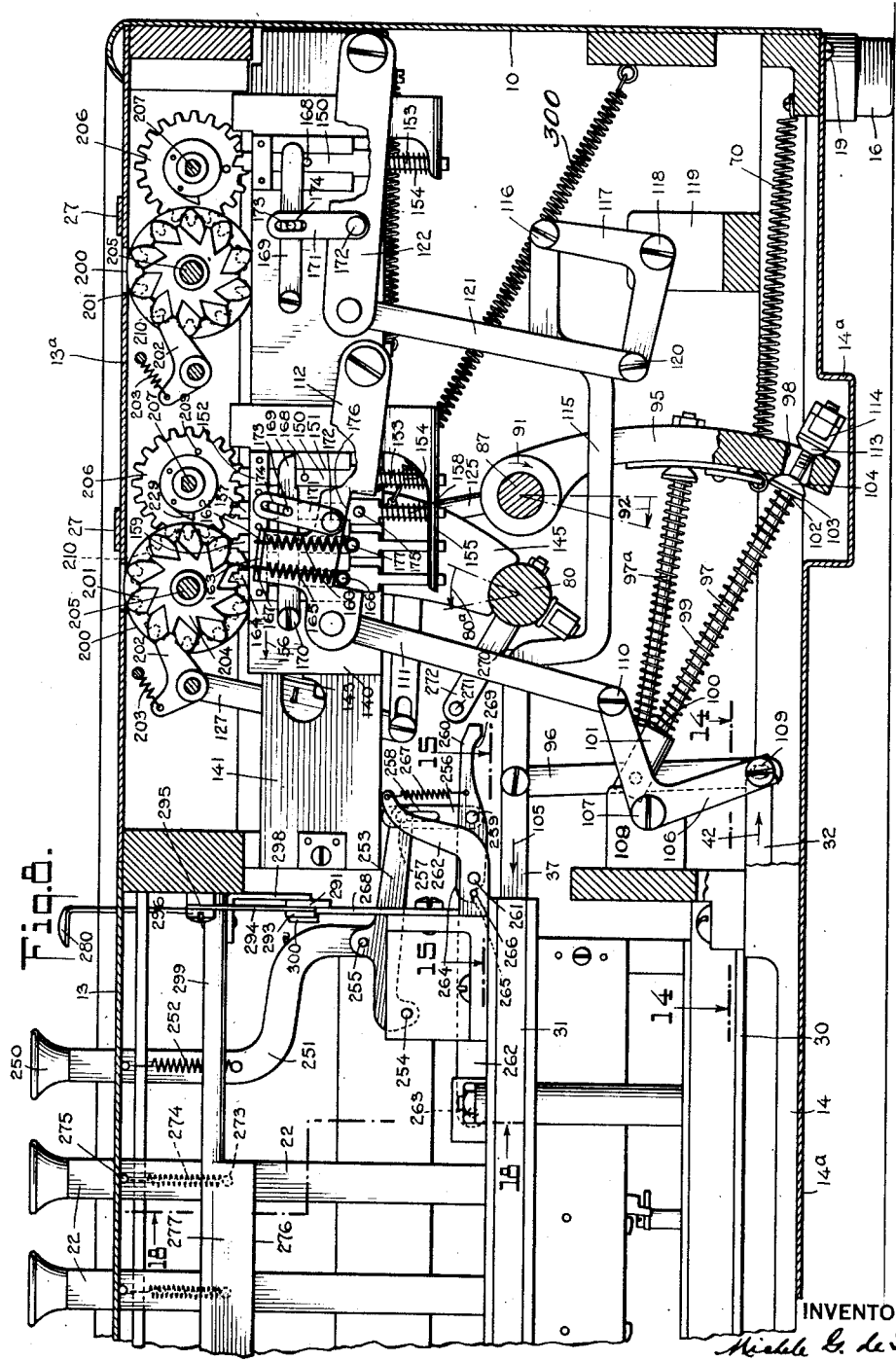

June 9, 1931. M. G. DE SIMONE 1,809,811
CALCULATING MACHINE
Filed May 26, 1925 5 Sheets-Sheet 4
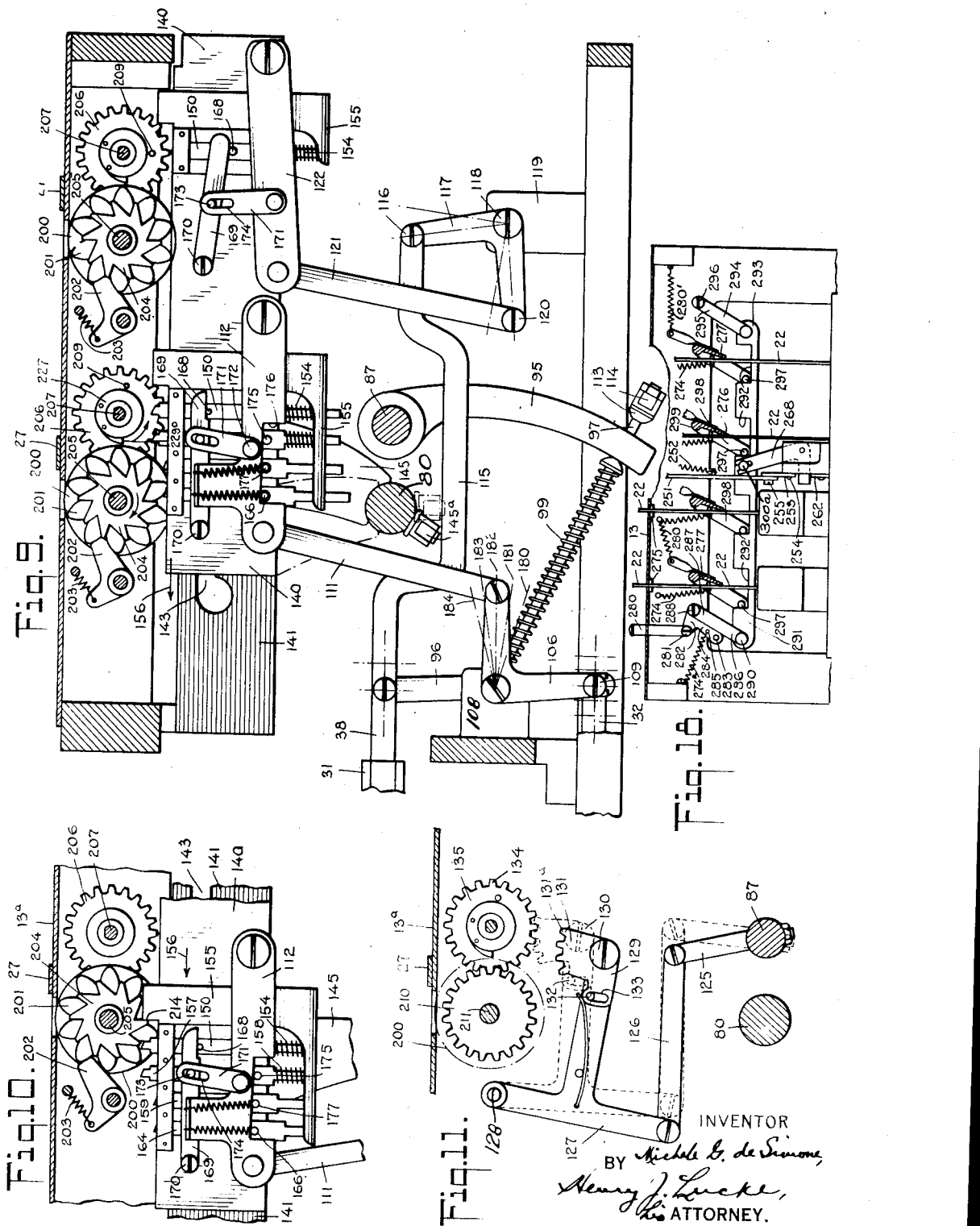

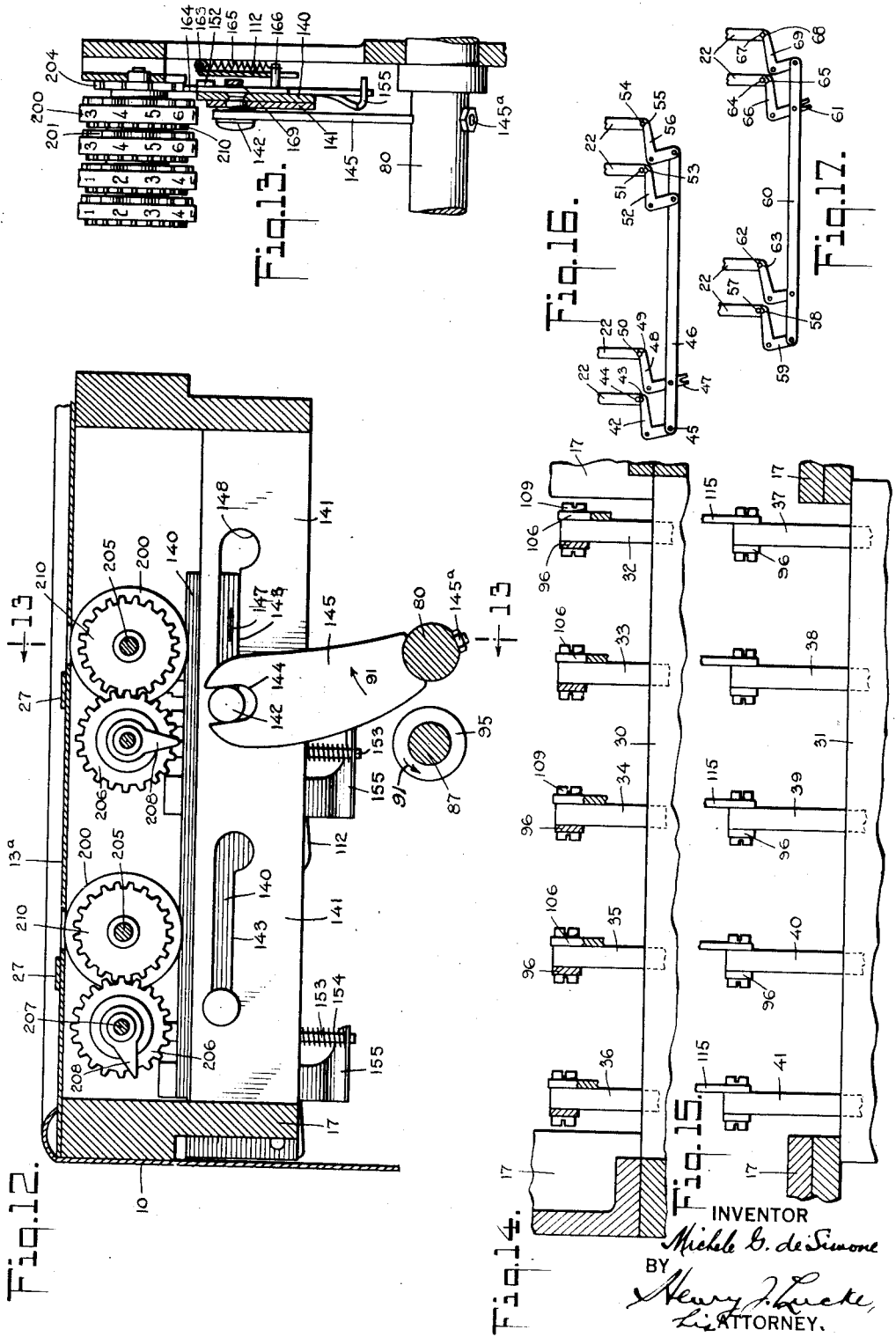

Patented June 9, 1931

1,809,811

UNITED STATES PATENT OFFICE

MICHELE GUGLIELMO DE SIMONE, OF STAPLETON, NEW YORK, ASSIGNOR TO GEORGE B. AGNEW, OF NEW YORK, N. Y.

CALCULATING MACHINE

Application filed May 26, 1925. Serial No. 32,892.

This invention relates to calculating machines.

In the forms of calculating machines involving the processes of addition or subtraction or multiplication or division, or two or more of the aforesaid processes, it has been the practice to arange the keys of the manually operated key board to directly effect the actuation of the respective counter controlling parts which are displaceable to the variable extents in correspondence to the numerical values represented by the manipulated keys. Such practice has obtained in the types of calculating machines wherein the keys directly actuate the counter controlling parts which in turn directly actuate the counters and wherein the counters are indirectly ac uated upon the operation of a hand operated crank or by a motor.

In such forms of the present-day and other heretofore types of calculating machines, there are present the disadvantages of variable effort required on the part of the operator for the respec ive keys, the variable momenta imparted to the relatively high variably displaced parts owing to the variability of manual effort applied by the operator, resulting in overthrow and underthrow, as the case may be, of the counters affected thereby, the introduction of large degrees of high values of friction and the repeated application of mechanical forces tending to overcome the tension of the necessary springs.

In the present-day and heretofore proposed types of calculating machines embodying a plurality of sets of counters, it is the general practice to displace the counter controlling parts directly or indirectly upon the setting of the keys of the key board and to effect the operation of the respective counters by maintaining in quiescence the counter controlling parts which are not involved in the particular values transmitted from the keys to the counters.

In such forms of prior art calculating machines, upon operation of the hand crank and therefore subjected to variable applied force and variable speed of operation, the variably displaced, counter controlling parts are accordingly subjected to variable momenta which are magnified by reason of the relatively high inertia of the mechanism actuated by the hand crank relative to the inertia of the variably displaced, counter controlling parts, thus giving rise to possible overthrow high impact of the counter controlling parts against their stops or equivalent parts as well as introducing the above stated serious conditions of high friction and the application of forces tending to deteriorate the uniformity of operation of the necessary springs.

Pursuant to my present invention, the keys of the key board coact with a key board mechanism comprised of but few parts and of relatively low inertia values and the operation of the keys effects the setting of the key operated mechanism to the positions for respectively arresting the counter controlling displaceable parts and the counter controlling displaceable parts are displaced under actuation of the mechanism actuated in turn by the hand crank or by a motor.

My present invention further comprises the organization of the counter controlling parts of variable displacement disposed in their respective normal positions at the maximum values of these parts and upon operation of the hand crank or by a motor the counter controlling parts are set in displaceable motion as an entirety whereby the parts through which it is desired to transfer zero values, are displaced to maximum extents and the remaining parts through which the values are desired to be transmitted, are displaced to extents corresponding inversely to the values to be transmitted.

The aforesaid features of my invention are illustrated by reference to a calculating machine of the denominator type.

My invention also embodies improvements for the type of denominator machine set forth in my U. S. Patent No. 1,476,804 dated December 11th, 1923 in respect to the general assembly of the counters, the counter controlling mechanism and in the organization of the key operated mechanism relative to the counter controlling mechanism.

Pursuant to my aforesaid Patent No. 1,476,804 indicators for the respective monetary denominations are provided, also a key board comprised of keys corresponding to the unit and decimal cent values and the unit and decimal and additional dollar values, a mechanism actuated by the keys in correspondence to the particular monetary values and the proper indicators actuated by suitable indicator actuating mechanism under manual control as by a hand-operated crank or by a motor. In the denominator machine construction of my aforesaid patent, the key operated mechanism is arranged to analyze the dollar and cent values into the minimum number of coins and bills or equivalent.

Assuming the value of $18.42 upon setting the keys and operating the hand crank or equivalent, the indicators of the respective denominations show the minimum number of bills and coins, the total intrinsic value of which is equal to the set value of $18.42, to wit, $$\frac{\$20}{0}. \quad \frac{\$10}{1}. \quad \frac{\$5}{1}. \quad \frac{\$2}{1}. \quad \frac{\$1}{1}.$$

$$\frac{50¢}{0} \quad \frac{25¢}{1} \quad \frac{10¢}{1} \quad \frac{5¢}{1} \quad \frac{1¢}{2}$$

Assuming the second value to be $52.25, the setting of the keys and operation of the hand crank effects the accummulation of the denominations common to the denominations of the first-named value and the operation of the counters of the new denominations introduced by the second-named value, to wit, $$\frac{\$20}{2}. \quad \frac{\$10}{2}. \quad \frac{\$5}{1}. \quad \frac{\$2}{2}. \quad \frac{\$1}{1}.$$

$$\frac{50¢}{0} \quad \frac{25¢}{2} \quad \frac{10¢}{1} \quad \frac{5¢}{1} \quad \frac{1¢}{2}$$

In a similar manner, the next successive values as desired are transferred from the keys of the key board to the counters of the respective denominations until the full list of the values has been set up in the key board and transferred to the counters. The readings of the counters of the respective denominations at the conclusion of the operation gives the number of bills and coins required for the values, such as the items of a pay roll, and affords the precise information of the number of bills and coins required from the bank in making up the pay roll. The total of the intrinsic values of the number of denominations checks up the total of the pay roll. Upon sorting the bills and coins in the pay envelopes on the basis of minimum number of bills and coins, the sorting of the pay roll money into the pay envelopes is also checked, thus affording a re-checking of the pay roll as a whole.

Further features and objects of the invention will be more fully understood from the following detail description and the accompanying drawings, in which Fig. 1 is a perspective view of a preferred form of denominator machine embodying my invention and of the hand operated type;

Fig. 8 is a sectional elevation on line 8—8 of Fig. 3;

Fig. 9 is a detail side elevation of the right-hand portion of Fig. 8, showing the unit cent counter and its actuating parts positioned preparatory to effect the transmission of the value of "2", and the unit dollar counter and its actuating parts positioned preparatory to effect the transmission of the "0" value;

Fig. 10 is a detail side elevation showing the unit cent counter and its actuating parts at a final position of transmitting the value of "2" to the counter;

Fig. 11 is a detail elevation of certain coacting parts of the unit cent counter for precluding overthrow;

Fig. 12 is a sectional elevation on line 12—12 of Fig. 3;

Fig. 13 is a sectional elevation on line 13—13 of Fig. 12;

Fig. 14 is a sectional elevation on line 14—14 of Fig. 8;

Fig. 15 is a sectional elevation on line 15—15 of Fig. 8;

Fig. 16 is a detail side elevation showing the 1¢, 2¢, 6¢ and 7¢ key stems, their respective bell crank levers and interconnecting link;

Fig. 17 is a detail view similar to Fig. 16 but showing the 3¢, 4¢, 8¢ and 9¢ key stems and their associated parts; and Fig. 18 is a sectional elevation on line 18—18 of Fig. 8.

Figure 1:
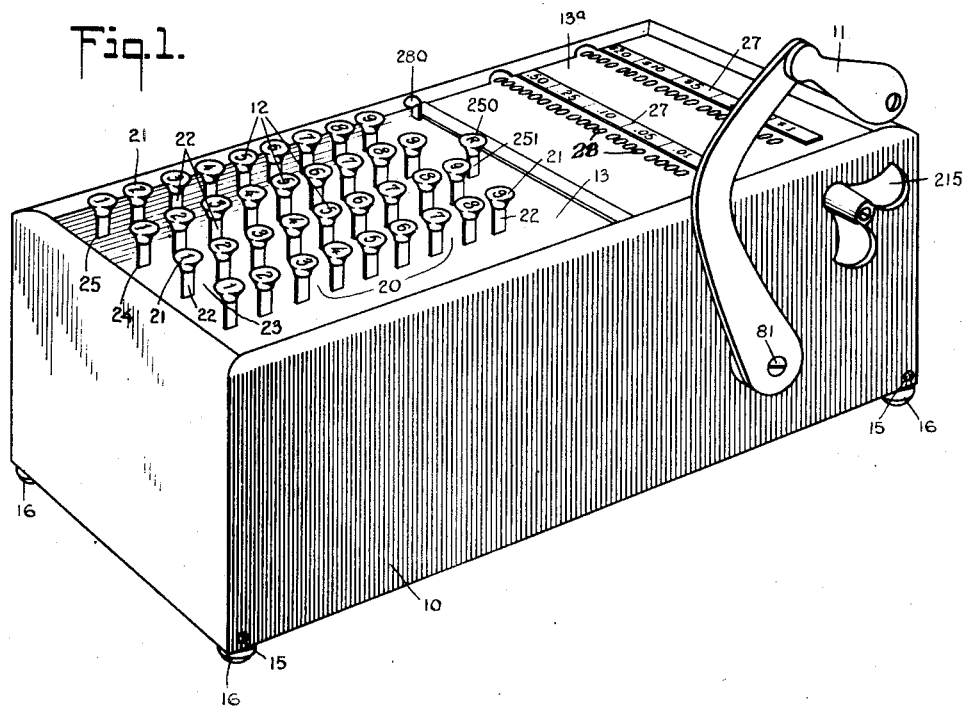

Referring to Fig. 1, the general contour of the machine as a whole and its casing is selected from the viewpoints of the desired overall dimensions, the relative arrangements of the parts for assembly and the form of control and of operation. In the particular form illustrated in Fig. 1, the general rectangular form of the casing 10 has been setheir appurtenant parts for the unit dollar and decimal dollar keys of the banks 24, 25 are enclosed in the sub-casing 31. The sub-casing 31 is shown vertically above the sub-casing 30, but such vertical relation is optional.

Corresponding to such physical sub-division of the analysis mechanism, I arrange the denominational rods for operative relation with the respective parts of the analysis mechanism pursuant to the present invention. Thus, slidingly mounted within the sub-casing 30 is disposed the rod 32 of the unit cent value; the 1¢ rod 32 is disposed at the right-hand side of the sub-casing 30 as viewed from the normal position of the operator relative to the casing 10, in Fig. 1 and as shown in Fig. 14. The 5¢ rod 33, see Fig. 14, is positioned next to the 1¢ rod 32, then follow in succession the 10¢ rod 34, the 25¢ rod 35 and the 50¢ rod 36.

The $1 rod 37, see Figs. 8 and 15, is disposed toward the extreme right-hand side of the sub-casing 31 and vertically above the 1¢ rod 32; next follow in succession toward the left the $2 rod 38, the $5 rod 39, the $10 rod 40 and the $20 rod 41, respectively above corresponding rods of the 5¢, 10¢, 25¢ and 50¢ denominations.

Conforming to my aforesaid Patent No. 1,476,804, the stems of the unit cent bank of keys are divided into three groups, one group formed of the stems of the 1¢, 2¢, 6¢ and 7¢ values and a second group formed of the 3¢, 4¢, 8¢ and 9¢ values and a third group formed of the 5¢, 6¢, 7¢, 8¢ and 9¢ values. The assembly of the key stems 22 of the 1¢ and 2¢ keys is shown in Fig. 16 herein, namely by the provision of a bell crank 42 having a socket 43 at its one end disposed in a position to receive the pin 44 on the stem 22 of the 1¢ key, the other arm of the bell crank lever 42 being pivotally connected at 45 to the link 46. In a similar manner, the stem 22 of the 2¢ key is provided with a bell crank lever 48, one arm of which is provided with the socket 49 for receiving the pin 50 and the other arm of which is pivotally connected to the link 46 and has a fork member 47 arranged to engage one arm of the main lever of the analysis mechanism as shown in my Patent 1,476,804, where the main lever has the reference number 51. Normally the pin 50 of the 2¢ key stem 22 is seated in its socket 49 whereby upon the depression of the stem 22 of the 2¢ key, its bell crank lever 48 is oscillated the full stroke corresponding to the extent of depression of the stem 22 of the 2¢ key. The normal position of the pin 44 of the stem 22 of the 1¢ key is at a clearance from its socket 43 whereby upon depression of the stem 22 of the 1¢ key, which is equal in extent to the depression of the stem 22 of the 2¢ key, such clearance effects the oscillation of its bell crank 42 for a one-half stroke.

The main lever of the analysis mechanism (not shown herein) corresponds to the main lever 51 of my aforesaid Patent No. 1,476,804 and such main lever is provided with a slotted lever corresponding to the lever 58 of my aforesaid patent and accordingly upon depression of the 1¢ key or the 2¢ key, the main lever is oscillated for a stroke corresponding respectively to the stroke indications 51—1 and 51—2 of my aforesaid patent, see Fig. 40 thereof, and the slotted lever 58 moved to a position corresponding to the 1¢ value or 2¢ value as the case may be. However, in the present invention, such movement of the aforesaid parts of my analysis mechanism does not actuate the 1¢ rod 32 for the reason that the pin corresponding to the pin 57 of my aforesaid patent is normally out of engagement with the closed end of the slotted lever 58 and as is set forth more fully hereinafter, the 1¢ rod 32 is normally resiliently held at a position to dispose its aforesaid pin a distance corresponding to the value of "4" from the closed end of the slotted lever corresponding to the slotted lever 58 of my aforesaid patent and the 1¢ rod 32 is moved in the direction of its length upon operation of the hand crank 11 simultaneously with the rods of the other denominations. Upon the operation of the 1¢ key the slotted lever is set for its position corresponding to the value of "1", and the pin of the 1¢ rod 32 is moved a distance corresponding to the value of "3", that is to say, the subtraction of the value of "3" from the value of "4" yields the value of "1". Similarly upon setting of the 2¢ key and during the stage of operation of the hand lever 11 and its actuated parts, the 1¢ rod 32 is displaced from its normal position through the distance corresponding to the value of "2", which by reason of the subtraction of the value of "2" from the value of "4", yields the value of "2".

The stem 22 of the 6¢ key is similarly provided with the pin 51 and its bell crank 52 provided with the socket 53 spaced at a clearance from the pin 51 equal to the value of unity and the other arm of the bell crank 52 is pivotally connected to the link 46.

In like manner, the stem 22 of the 7¢ key is provided with the pin 54 normally received within the socket 55 in its bell crank 56, also pivotally connected with the link 46.

The 6¢ and 7¢ keys are also provided with pins for the operation of another bell crank lever having a fork for connection with the main lever of the 5¢ denomination corresponding to the main lever 83 of my aforesaid patent, whereby the angle lever corresponding to the angle lever 84 of my aforesaid patent is set to a position corresponding to the value of "1".

The normal position of the 5¢ rod 33 pursuant to my present invention is at a distance whereby its pin corresponding to the pin 86 of my aforesaid patent is displaced from the lected. The particular embodiment of the invention is illustrated of the hand crank operated type.

Figure 2:
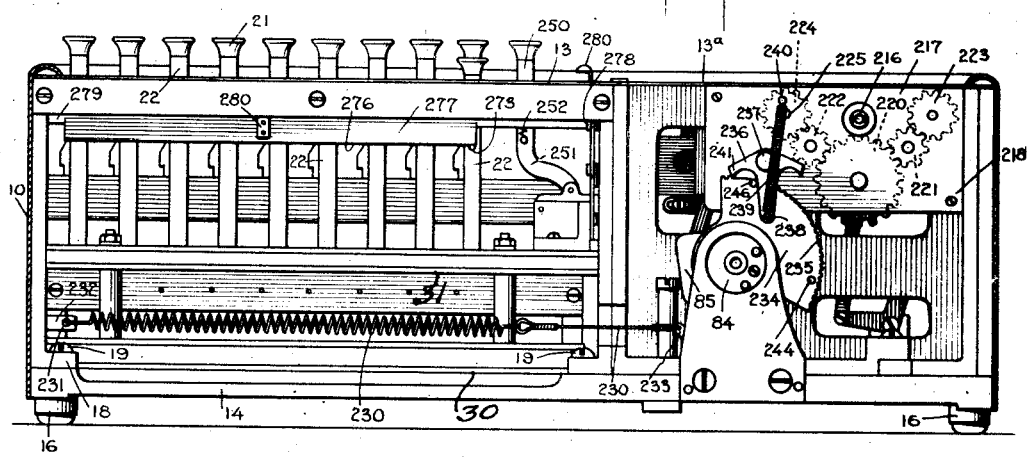
Fig. 2 is an elevation of the machine shown in Fig. 1 with the cover removed and as viewed from the side at which the handle is applied.

For convenience of operation of the form of the invention shown in Fig. 1, the operating handle 11 is located on the right-hand side of the casing 10, as viewed from the position of the operator when facing the key board 12. The casing 10 as shown is a shell which is integral at its opposite sides and ends and with the upper flanges at its sides and ends for retaining the top plates 13, 13a. The bottom casting 14, and enclosing plate 14a, see Figs. 2 and 8, are provided for the open bottom of the shell 10. The screws 15 afford the positioning and removal of the shell 10 from the bottom casing 14. The feet 16 are secured to the under face of the bottom casting 14. The mechanism proper of the machine is mounted on an open frame 17 including suitable lugs or extensions 18 for removably securing by screws 19 the bottom casting 14 and the bottom plate 14a.

The bank of unit cent keys is indicated at 20 and preferably comprises nine keys, see Fig. 1, representing the respective unit cent values; these keys are arranged in alignment and bear the corresponding numerals "1" to "9" on the caps 21 of the respective key stems 22 as indicated. The bank of decimal cent value keys is indicated at 23, the caps 21 and the key stems 22 of which correspond to like designated parts of the unit cent bank 20. The bank of unit dollar keys indicated at 24 and the bank of decimal dollar keys is indicated at 25, the key stems 22 of which banks 24, 25 are similarly arranged in alignment with one another and are provided with caps 21 bearing the numerical values "1" to "9".

As shown in the drawings, it is preferred to omit keys corresponding to the zero values of the respective unit cent, decimal cent, unit dollar and decimal dollar values, thus simplifying the key board and also the mechanism zero keys.

The aforesaid key board 12 is preferably arranged on the top plate 13 of the casing shell 10 provided with the usual slots for receiving and guiding the respective key stems 22 in their respective movements of depression upon manipulation and rise in consequence of the automatic return of each key stem upon completion of the stroke of the crank handle 11.

The top plate 13a of the casing 10 is provided with openings 28 or windows or equivalent for affording observation of the indications of the number counters of the respective monetary denominations; adjacent the two rows of windows 28 are positioned the strips 27 bearing the respective monetary denominations.

In the particular form of the denominator machine illustrated in Fig. 1, the monetary denominations are 1¢ i. e. one cent, 5¢ i. e. a nickel, 10¢ i. e., a dime, 25¢ i. e., a quarter, 50¢ i. e., a half dollar, the aforesaid being arranged on one row, and the other row for the dollar values namely $1 i. e., one dollar, $2 i. e., two dollars, $5 i. e., five dollars, $10 i. e., ten dollars and $20 i. e., twenty dollars.

It will be observed that in the particular embodiment illustrated, the $20 denomination is selected as the denomination of highest monetary value, but it will be apparent that higher monetary values corresponding to the United States currency may be provided for and corresponding changes made in the analyzing mechanism and the denominational rods.

It will also be understood that a bank of keys corresponding to the hundred dollar values may be employed and the required parts of the same pursuant to the invention are added.

As indicated hereinabove, the form of denominator machine embodying my present invention attains the general results set forth in my aforesaid U. S. Patent No. 1,476,804, namely, that upon manipulation of the keys corresponding to the particular monetary values by successive setting of the keys for any particular value and thereupon operating the handle 11, the counters of the respective denominations are actuated to indicate the denominations and the number of the same required for such particular value. Upon manipulating the key board for the next particular value, the counters of the denomination now involved are operated and thus for the remaining values. The counters of the respective denominations accumulate the total number of the respective denominations. In making up pay-rolls, the counters show the respective denominations required and the pay envelopes are filled on the basis of minimum bills and coins, thus affording a direct check on the proper filling of the pay envelopes and the total of the pay-roll.

The analysis mechanism of the present embodiment corresponds substantially to the analysis mechanism described and claimed in my aforesaid U. S. Patent No. 1,476,804, and accordingly a detail description and a specific reference to the parts thereof by reference numbers becomes unnecessary. However, by reason of the reduced width of the casing 10 of the denominator machine illustrated in the drawings, the analysis mechanism is divided physically into two parts, namely the main levers, angle levers, floating levers and interconnecting links with their appurtenant parts controlled by the unit cent and decimal cent banks of keys 20, 23, which parts of the analysis mechanism are enclosed in the sub-casing 30, see Fig. 8, and the main levers, angle levers, floating levers and interconnecting levers with open slot of the angle lever 84 a distance corresponding to the value of "1" and upon operation of the hand crank 11 and its actuated mechanism, the 5¢ rod 33 is held in its normal position corresponding to the value of unity or "1".

In a like manner, the stem 22 of the 3¢ key is provided with a pin 57 corresponding to the pin 43 of the stem 22 of the 1¢ key, which pin 57 is normally disposed from its socket 58 at a clearance corresponding to the value of unity; its bell crank lever 59 is pivotally connected to the link 60 provided with the fork 61, to be received over the reduced end of the main lever of the analysis mechanism, carrying at its opposite end an oscillated lever such as shown in my aforesaid patent. However, in my present invention, the pin of the 1¢ rod 32 corresponding to the pin of my aforesaid patent is normally located at a clearance equal to the value of "2" from the closed end of the slot of the slotted lever corresponding to the oscillated slotted lever of my aforesaid patent. Accordingly, upon depression of the 3¢ key, its pin 57 effectively operates its bell crank lever 59 to move link 60 and lever 66 and fork 61 for a value of "1" and thereby oscillates the main lever through the arc indicated in my aforesaid patent in Fig. 40 by the reference line 73—3.

The stem of the 4¢ key is provided with the pin 62 related to its socket 63 similarly to the pin 49 and the socket 50 of the 2¢ key, whereby upon depression of the 4¢ key, the main lever and its slotted lever are moved correspondingly to the value of "2", that is to say, the closed end of the slot of the slotted lever is brought in contact with the pin corresponding to the pin of my aforesaid patent, and upon operation of the hand crank 11, the 1¢ rod 32 is held in its normal position and effects the transmission of the value of "4" to the counter mechanism, as set forth more fully hereinafter.

The stem of the 8¢ key is provided with the pin 64 corresponding to the pin 57 of the 3¢ key, which pin 64 cooperates with the socket 65 of the bell crank lever 66. The stem of the 9¢ key is provided with the pin 67 corresponding to the pin 62, which pin 67 coacts with the socket 68 of the bell crank 69, also connected to the link 60. Associated with each of the 8¢ and 9¢ key stems is a bell crank for operating the main lever of the 5¢ denomination for the stroke of one, as in my aforesaid patent.

The stems of the keys of the bank 23 of a decimal cent values are grouped similar to my aforesaid Patent No. 1,476,804, namely in four groups and associated with main levers corresponding to my aforesaid patent, with angle levers and slotted levers and interconnecting levers for setting the angle levers and slotted levers for the positions corresponding to the number of the denominations involved to yield the minimum number of coins. These parts are interconnected with one another to effect the "cancellation" of indications of the denominations of lower values in such instances where a denomination of higher value is substituted to attain the desired minimum number of coins, and it will be understood that the present invention involves a like assembly of bell cranks arranged in groups, with interconnecting links having forks for engagement respectively with the main levers to operate the same through the required stroke or through movements of cancellation and additions of strokes to set the respective angle levers and slotted levers as the case may be in the positions corresponding to those of my aforesaid patent.

The 10¢ rod 34, 25¢ rod 35 and 50¢ rod 36 are similarly normally held in their extended positions to locate their pins out of contact with their angle levers and slotted levers and upon operation of the hand crank 11 and its actuated parts, the aforesaid denominational rods are operated or non-operated as the case may be on the same principle as set forth with respect to the 1¢ rod 32 and the 5¢ rod 33, bearing in mind that the 10¢ rod 34 has the possible maximum stroke of "2", the 25¢ rod 35 the possible maximum stroke of "1" and the 50¢ rod 36 the possible maximum stroke of "1".

In a similar manner, the $1 rod 37, $2 rod 38, $5 rod 39, $10 rod 40 and the $20 rod 41 are normally resiliently held in position to locate their pins out of contact with the respective slotted levers set by the respective main levers of these denominations, as in the denominations of the coins as aforesaid. The $2 rod 38 has the possible maximum displacement of "2" and the $20 rod 41 the possible maximum stroke of "4", whereas the possible maximum stroke of each of the remaining dollar rods is "1". Similarly, for the coin denominations, the dollar denominational rods are moved from their respective normal positions by the actuated mechanism of the hand lever 11 and the effective values transmitted by the respective dollar denomination rods are inverse in value to the extent of displacement from their respective normal positions.

As is set forth more fully hereinafter, the five cent denomination rod and the five dollar denomination rod are grouped in pairs, the rods of any pair being vertically related to one another, and interconnected by links and such links are actuated by arms fixed to the shaft of the crank shaft and resilient members interconnecting these arms with the links respectively, such arms positively returning said pairs of rods as an entirety to their respective normal positions. The return of said arms is effected by the spring 70, see Fig. 8, acting in common upon all of the arms by reason of the rigid connection of the respective arms to the shaft of the hand lever 11, as will appear more clearly hereinafter.

In the specific embodiment illustrated in the drawings in this application, the $20 denominational value has been selected as the maximum whereas in my aforesaid patented construction the $10 value was selected as the maximum and the $20 denomination omitted. Accordingly, pursuant to the present invention, the single pin of the $10 rod 40 has a minimum displacement of unity and accordingly the pin of the $10 rod 40 in its normal position is displaced a distance corresponding to the value of unity.

Upon operation of the hand crank 11, the counter operating mechanism is actuated and the denominational rods not involved in the particular value set up on the key board are moved through their full strokes, but without any effect upon the corresponding counters, whereas the denominational rods involved in the particular value set on the key board are arrested at positions corresponding to the number of such denominations required.

The counter operating mechanism is illustrated in general in Fig. 2 and in detail in Figs. 4 to 12, inclusive.

The hand crank 11 is mounted on the shaft 80, and preferably removably thereon by means of the set screw 81, see Fig. 1. The shaft 80 is mounted adjacent its right-hand end in the bracket portion 82 see Fig. 7 of the frame 17 see Fig. 15 and adjacent its left-hand end in a similar bracket portion at the opposite end of the frame 17.

Figure 4:
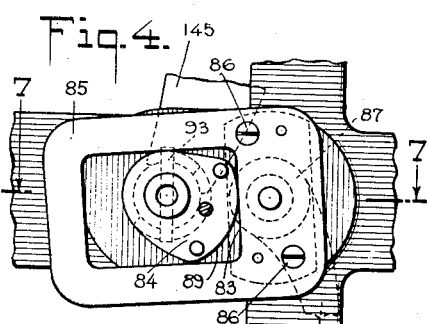
Fig. 4 is a detail side elevation of the cam and coacting parts actuated by the handle.
Figure 6:
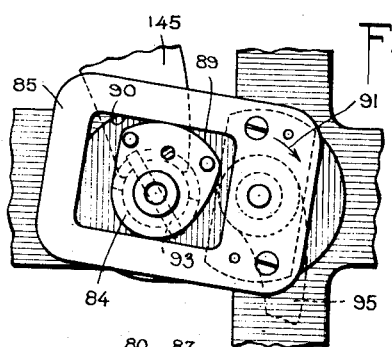
Fig. 6 is a detail view similar to Figs. 4 and 5 and at the fully advanced stage of the movements of these parts.
Figure 5:
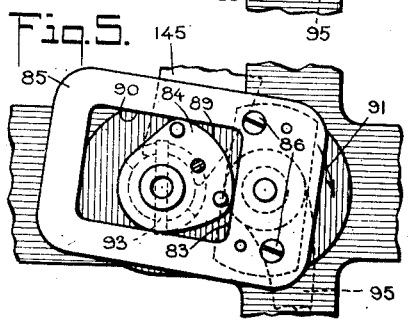
Fig. 5 is a detail elevation similar to Fig. 4, showing the cam and its coacting parts at an intermediate stage of their movements.

Mounted on the shaft 80, and adjacent the right-hand side of the casing 10, near the hub of the hand crank 11, I have arranged the cam 84, see Fig. 4, co-operating with the cam frame 85 secured by the screws 86 to the shaft 87. The shaft 87 is mounted substantially parallel to the shaft 80; the shaft 87 is journalled at its one end, see Fig. 7, in the bearing portion or spider 88 of the frame 17 and similarly journalled at its opposite end.

The normal positions of the cam 84 and the cam frame 85 are shown in Fig. 4, at which stage the effective face 89 of the cam 84 engages the face 83 of the cam frame 85. Upon depression of the hand crank 11 from its normal position, see Fig. 1, the effective face 89 of the cam 84 makes initial contact with the face 90 of the cam frame 85 thereby causing the cam frame 85 and its shaft 87 to rotate upwardly or in clockwise direction as indicated by the arrow 91, see Fig. 5. Upon continued depression of the hand crank 11, the cam face 89 completes its contact with the face 90 of the cam frame 85, see Fig. 6, to effect a further and full rotation of the cam frame 85 and its shaft 87 in the same direction 91. The maximum extent of rotation of the cam frame 85 in the direction of the arrow 91 is indicated by a comparison of Fig. 4 with Fig. 6 which corresponds to the arc 92 of oscillation shown in Fig. 8. The continued depression of the hand crank 11 continuing the rotation of the cam 84 is without any rotational effect upon the cam frame 85 and its shaft 87.

Figure 7:
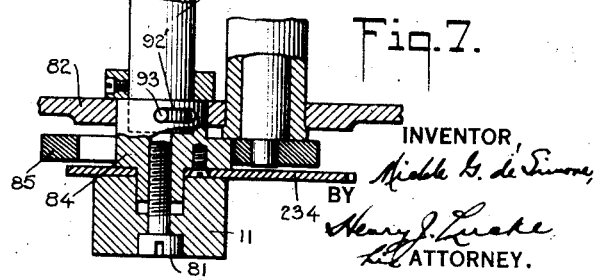
Fig. 7 is a sectional view on line 7—7 of Fig. 4.

A predetermined extent of lost motion is provided for between the crank handle 11 and its shaft 80, as by the provision of the slot 92', see Fig. 7, on the periphery of the crank shaft 80 and a pin 93 carried by the hub 94 of the crank handle 11 whereby the shaft 80 is delayed in its effective rotational movement at the beginning of the movement of depression of the hand crank 11 from its normal position to thereby delay the movements of the parts actuated by the shaft 80, as appears more fully hereinafter. The normal positions of these parts are indicated in Fig. 7.

The shaft 87 serves to transmit the motion of displacement of the denominational rods from their normal positions in their transfer movement of the values from the manipulated keys to the denominational counters respectively and also to operate certain devices for respectively preventing overthrow of the counters.

As one means for attaining the displacement of the denominational rods, I provide, see Figs. 8 and 9, the radial arms 95 of a suitable number, and in this instance of the number of five corresponding to the respective pairs of the denominational rods, disposed respectively one above the other, see Figs. 14 and 15. To simplify the number of parts and to attain rigid connection between the moving parts, I connect the 1¢ rod 32 with the $1 rod 37 by the link 96 and at a central portion of the link 96 is pivotally connected the arm 97 extending through the recess 98 in the radial arm 95. The link 96 is pivotally connected to the upper rod 37 and by a slot at the lower end of the link 96 and a pin carried by the lower rod 32, to provide for relative movements between the two rods and the link; the slot at the lower end of the link 96 is indicated by dotted outline in Fig. 8. About the arm 97 is coiled the expansive spring 99 abutting at its inner end 100 on the enlarged end portion 101 of the arm 97; against the outer end 102 of the coiled spring 99 I provide the collar 103 loosely mounted on the arm 97 to permit sliding relationship therewith. The head 104 of the collar 103 is rounded to be received within the rounded opening of the perforation 98 in the radial arm 95. Accordingly, upon actuation of the shaft 87 in the direction of the arrow 91 as aforesaid, the rotation of the radial arm 95 is bodily in the like or clockwise direction, see Fig. 8, whereby the arm 95 at its opening 98 engages the head 104 of the loose collar 103, applies pressure to the spring 99 to thereby tend to jointly move the 1¢ rod 32 and the $1 rod 37 each in the direction of the arrow 105, which direction is the opposite to that of the direction indicated by the arrow 42 hereinabove referred to. The displacement of the 1¢ rod 32 as thus effected may be for any one of its values from 1¢ to 3¢ and the displacement of the $1. rod 37 may be for the value of "1," thereby giving rise to variable extent of movements of displacement of the denominational rod and consequently of variable movement of the link 96. For the "4" value the 1¢ rod 32 is not displaced and the $1. rod 38 is not displaced for its "1" value. The continued rotation of the radial arm 95 in the direction of the arrow 91 upon displacing the 1¢ rod 32 and the $1. rod 37 to the desired extent, effects the further sliding motion of the collar 103 relative to its arm 97 and further compression of the spring 99 on the arm 97, but without any effect upon the displacement of the 1¢ rod 32 or the $1. rod 37.

To translate such displacement movement of the 1¢ rod 32 to the 1¢ counters, I provide the mechanism described more fully hereinafter but which includes the bell crank 106 pivotally mounted at 107 to the block 108, having its one arm pivotally connected at 109 to the 1¢ rod 32 and its other arm pivotally connected at 110 to the link 111 for operation of the variable tooth rack 112 and the associated parts of the counter operating mechanism.

Upon the return or upward movement of the hand crank 11, the arm 95 encounters the head 113 of the adjustable stop 114 secured to the arm 97 and thereby returns the link 96 and therewith the 1¢ rod 32 and the $1. rod 37 to their respective normal positions.

The denominational rods for the 5¢, 10¢, 25¢ and 50¢ denominations are similarly respectively provided with bell crank levers corresponding to the aforesaid bell crank lever 106 of the 1¢ denomination and also with links and racks respectively similar to the link 111 and the rack 112 of the 1¢ denomination.

For actuation of the dollar denomination counters by the $1., $2., $5., $10. and $20. rods respectively, I extend each denominational rod in the manner of the $1. rod 37 as shown in Figs. 8 and 9, namely by the extension 115, which is downwardly curved to clear the shaft 80 and its associated parts and connected at its outer end 116 to one arm of the bell crank 117 pivotally mounted at 118 on the block 119 and connected at its opposite arm at 120 to the link 121 for operating the rack 122 for movement of the counters of the denomination.

For preventing overthrow of the counters as is set forth more clearly hereinafter, I provide the arms 125, see Fig. 11, in number corresponding to the different denominations, each of which arms 125 is connected by a link 126 to the lever 127 pivoted at 128 to a suitably fixed support. The plate 129 is pivoted on the screw 130 which is carried by the lever 127. This plate has a slot 133 at one end in which the pin 132 on the lever 127 can oscillate. On the other end of the plate 129 are teeth constituting a gear segment 131 adapted to mesh with gear 135. The length of the slot 133 corresponds with the angular space occupied by two of the teeth 131$^a$. It is observed here also that the teeth 134 of the carry-over wheel 135 of each set of counters is of the number of 20 corresponding as a total to the numerical value of "10", thereby providing for the unity value equal to the spacing of two teeth.

It is observed at this point that the 1¢ rod 32 and the $20 rod 41 are capable of the maximum displacement of four, whereas the other denominational rods have a lesser extent of maximum displacement. For this reason, the rod 96 connected to the radial arm 95 for the 1¢ denominational rod 32 and likewise the rod of the $20 denominational rod 41 are disposed more closely toward the end of their respective arms 95 whereas the corresponding rod of the other denominations is set to connect with its radial arm more remotely from the end of its radial arm, as is indicated at 97$a$ in Fig. 8 for operating jointly the 5¢ rod 33 and the $2 rod 38.

To effect the transfer of values from the denominational rods to the respective counters, I provide the variable tooth rack comprising the slide member 140, see Figs. 8, 9, 10 and 12, for the respective denominations. The slide 140 of the 1¢ denomination is provided for four rack teeth; it is supported from and slides relative to the plate 141 by means of the headed screws 142 passing through the slots 143 in the supporting plate 141. The head 142 of one of these screws is received within the open ended slot 144 of the radial arm 145 extending from and carried by the main shaft 80 by means of a reduced extension of the arm 145 and a nut 145$a$ whereby upon rotation of the main shaft 80 in the direction of the arrow 146, see Fig. 12, corresponding to the direction of the arrow 91 as aforesaid, see Fig. 8, the slide member 140 is moved in the direction of its length, i. e., in the direction of the arrow 147, see Fig. 12, and thus reciprocated through a uniform stroke for all oscillations of the shaft 80. The extent of reciprocation of the shaft 80 is indicated in Fig. 8 by the arc 80$a$. The enlarged portions 148 of the slots 143 are for the purpose of permitting the heads 142 of the screws to be passed through for assembly in the slot 143 and removal therefrom. The common retractile spring 300 aids in the return of the slide members 140.

Combined with the sliding member 140 is the rack of variable number of teeth, the number of which is determined by the maximum value of the particular denominational rod controlling such variable rack. The variability of the effective number of rack teeth is attained in such arrangement of uniform reciprocation of the slide member 140 by the extent of oscillation of the controlling bell crank corresponding to the particular denomination rod.

Bearing in mind that the illustrated embodiment operates on the principle of the greater the stroke of actuation of the denominational rod, the less monetary value is to be transferred to the counter mechanism, it follows that the greater the value the less number of effective teeth are brought into engagement with the counter. The total number of rack teeth of any particular variable rack corresponds to the maximum number of the value of the denominational rod. For the 1¢ slide 140, I provide four teeth. The tooth 150 is slidingly mounted within the grooved recess 151 (Fig. 8) of the slide plate 140 and held in its groove by the retaining plate 152. The lower portion 153 of the tooth 150 is reduced in width, which reduced portion is surrounded by the coiled expansive spring 154, the lower end of which spring abuts the face of the flattened extension 155 of the slide plate 140. The spring 153 normally holds the pin 150 in its upper and operative position, in which position upon sliding movement of the slide member 140 in the direction of the arrow 156, see Fig. 8, corresponding to the arrow 147 of Fig. 12, the tooth 150 provides for the registration of "1" on the 1¢ variable rack.

In a similar manner, the second tooth 157 corresponds to the value of "2" and is similarly mounted within a grooved recess and provided with the expansive coiled spring 158 at its lower reduced portion for normally holding the tooth 157 in its upper and operative position for a registration of the value of "2" in cooperation with the aforesaid tooth 150 of its value of "1" on the counter 149.

The next or "3" tooth of the 1¢ denomination is 159, similarly mounted in a grooved recess. Its spring 160 is of the retractile type, which in this instance is selected by reason of the greater extent of movement of the tooth 159 relative to the extension 155 when the tooth 159 is in its lower or non-operative position. The spring 160 is held at its lower end about the pin 177 and at its upper end 162 within a suitable recess in the flange 163 of the lever 112.

The "4" tooth 164 of the 1¢ denomination slide 140 is similarly mounted within a grooved recess and is provided with a retractile spring 165 similar to the aforesaid retractile spring 160; the lower end of the retractile spring 165 is held about the pin 166 and its upper end 167 is seated within a recess in the aforesaid flange 163 of the lever 112.

For the purpose of causing the respective teeth to be moved from their upper or operative positions to their lower or non-operative positions, I provide the following parts.

For the "1" tooth 150, the pin 168 is located on the body of the tooth 150 to be engaged by the lever 169 pivotally mounted at 170 on the slide plate 140. The link 171 is pivotally connected at 172 to the lever 112 and is fixed to the lever 169 by means of the pin 173 received within the slot 174 of determined length. Thus in the event of the value of zero for the 1¢ denomination, the 1¢ denominational slide 140 is displaced its uniform extent, as aforesaid, by the bell crank 106 through its maximum arc, thereby depressing the link 112 to its maximum extent, causing the pin 173 to slide in the slot 174 and engage its upper closed end, thus causing the lever 169 to be depressed against the spring 154 and causing free end of the lever 169 to engage the pin 168 and thereby depress the tooth 150 against its spring 153 to move the tooth 150 to its non-operative position.

The movement of the next or "2" tooth 157 to its non-operative position is by means of the pin 175 coacting with the face 176 of the cut away portion of the lever 112, whereby upon depression of the lever 112 to sufficient extent to engage at 176 the pin 175 and move the pin 175 and its rack tooth 157 the "2" tooth 157 is depressed and rendered ineffective upon the movement of the denominational slide 140. The next or "3" tooth 159 of the 1¢ denomination is depressed by its pin 177 in contact with and depression by the face 176 of the lever 112 in a similar manner. The movement of the next or "4" tooth 164 to its non-operative position is effected by its pin 166 in coaction with the face 176 of the lever 112. The position of the lever 112 and of its face 176 as shown in Fig. 8 effects the operative position of all of the rack teeth 150, 157, 159 and 164, namely for the value of "4". The positions of the lever 112, its face 176 and of the bell crank 106 and the link 111 corresponds for the value of "2" and these parts are shown at the beginning of the stage of reciprocation of the 1¢ slide 140.

The different extents of arcuate movement of the bell crank 106 are indicated in Fig. 9. The dot and dash radial line 180 indicates the zero value and the dot and dash radial line 181 indicates the value of "1". For the value of "2" two, the extent of arcuate movement of the bell crank 106 is indicated at 182; for the value of "3" its extent of oscillation is indicated at 183 and for the value of "4", its extent of rotation is indicated by the radial dot and dash line 184.

The counting mechanism per se may be of any desired construction such as those which are in common use today. Each number wheel 200 bears numbered designations from "0" to "9", which are uniformly spaced on the periphery of each number wheel 200. At one side of and secured to each number wheel 200 is the usual bull tooth wheel 201 having its teeth disposed in radial alignment with the respective numbers; the bull teeth cooperate with a ratchet pawl 202 tensioned by a suitable spring 203 to preclude rotation of the number wheels in the wrong direction and prevent premature movement of its number wheel in the proper direction.

The unit cent number wheel 200 of each set is directly actuated by its denomination rack comprising as aforesaid a slide 140 which is operated through a uniform path of reciprocation for every stroke of the crank handle 11 and the variable teeth of each denomination rack carried by its slide 140 cooperate directly with a star wheel 204 splined to the shaft 205 or otherwise secured to such unit cent number wheel 200. Each star wheel 204 is provided with ten teeth extending uniformly and equally spaced one-tenth of the complete circumference.

Cooperating with each unit cent wheel 200 is the usual carry-over wheel 206, see Fig. 8, freely mounted on a shaft 207 and provided with a carry-over tooth 208, see Fig. 12, secured to the wheel 206 co-operating with the teeth of the succeeding bull wheel 210. The teeth of the carry-over wheel 206 mesh with a suitably toothed wheel 210, see Fig. 11, splined to the shaft 211 of the ten cent number wheel 200 to carry-over the value of "1" from the unit cent wheel 200 from its value of "9" at the stage of numerical addition as will be understood. In a similar manner, a like carry-over wheel 206 is provided in co-operation with the tens cent number wheel for carrying over the value of the "1" upon passage of the value of the tens cent number wheel from "9" to "0", and similarly for the higher number wheels.

I prefer to prevent overthrow of the number wheels by the provision of a positive stop which is brought at the proper time interval into engagement with the number wheel or an element controlling the number wheel. As one such means I illustrate in Fig. 10 in relation to the 1¢ denominator counter shown at the left and the $1. denominator counter shown at the right, the stops 214 which are of the form of an upward extension of the plate 155, and accordingly a rigid part of the slide member 140. Such stop 214 is brought into engagement between the proper teeth of the star wheel 204, as is illustrated in Fig. 10 in relation to the 1¢ denominator counter.

Figure 3:
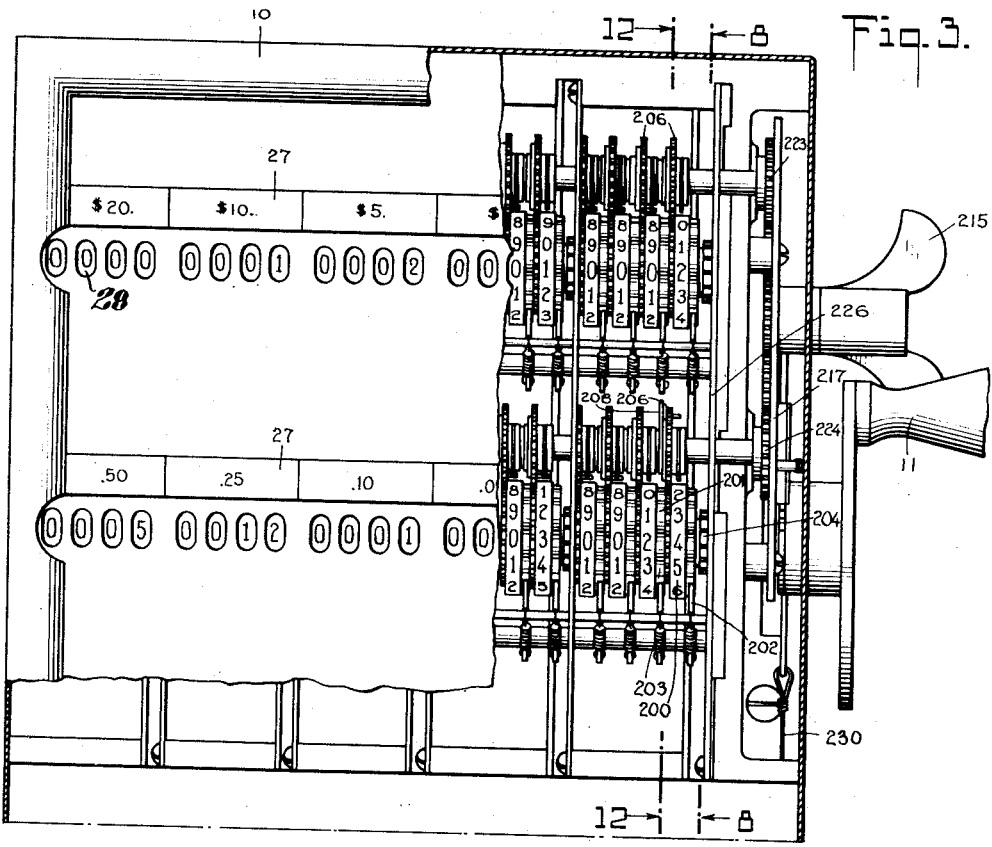
Fig. 3 is a detail top plan view on an enlarged scale of the windowed portion of the cover disposed above the denominational indicators, this portion of the cover is broken away to show the counters of the unit cent and unit dollar denominations and parts of the nickel and two dollar denominations.

Suitable means are provided for restoring the number wheels to their "0" positions respectively, and preferably of the form of a single or common member for effecting such restoration. In Figs. 1, 2 and 3, I have indicated the winged wheel 215 secured to the shaft 216 which is suitably journaled in the plate 217, secured by screws 218 or the like to the frame 17 of the general mechanism, and adjacent to the shafts of the carry-over wheels. On the shaft 216 is splined a suitable gear, (not shown), meshing with the large gear 220, meshing in turn with the oppositely disposed gears 221, 222 in the respective directions toward and in mesh with the gears 223, 224 located in substantial alignment with the shafts of the carry-over wheels 206. The gear 224 is splined to its shaft 225, see Fig. 2, which shaft 225 is journaled in the plate 226, see Fig. 3, and the shaft 225 is splined to the shaft 207, which as aforesaid freely carries the carry-over wheels 206 of the respective sets of counters of the respective denominations. Splined to or otherwise suitably secured to the shaft 207, I provide the circular disk member 227 provided with the detent 229 whereby upon rotation of the winged wheel 215, and consequent rotation of the shafts 207, the detents 229 respectively encounter the pins 209 of the respective carry-over wheels 206 thereby effecting the rotation of each carry-over wheel 206 and therewith the gear wheel 210, (Fig. 11) and thus rotating the unit and tens cents and the hundreds and higher number wheels 200 in the direction of increasing value, which rotation is continued until the "0" indication appears through the windows 28 of the casing.

The hand crank 11 is preferably returned automatically as by means of the spring 230, see Fig. 2, having its fixed end 231 seated in a pin 232 and its free end secured to the extension 233 of the plate 234 splined or otherwise secured to the shaft 80 of the hand crank 11.

For the purpose of preventing a return movement of the handle 11 after only a partial stroke of the hand crank 11, I provide the plate 234, see Fig. 2, with the segmental teeth 235 arranged concentric with the axis of the shaft 80, cooperating with the dog 236 pivotally mounted at 237 of its upper portion to the plate 217 or other suitable fixed support, the lower portion of the dog 236 being provided with the pin 238 for receiving the free end of the spring 239, the fixed end of which is hung from the pin 240 secured to the plate 217. The center of the pivot 237 is disposed on the side of the straight line joining the pin 238 of the dog 236 and the pin 240, thereby normally holding the pointed end 241 of the dog 236 in yielding contact with the segmental teeth 235 while the hand crank 11 is being depressed on its operative stroke but preventing the return of the hand crank 11 upon partial stroke by the seating of the pointed end 241 between two of the segmental teeth 235.

To automatically permit the hand crank 11 to be returned upon this full stroke, I provide the pin 244 on the plate 234 in such position with the pin 244 encounters the body portion of the dog 236 just prior to the stage when the hand crank 11 attains its position of full stroke, whereupon the hand crank 11 attaining its full stroke position the body portion of the dog 236 carrying the free end 238 of the spring 239 is moved to the opposite side of the pivot point 237, thereby retracting the pointed end 241 of the dog 236 from engagement from the segmental teeth 235 of the plate 234; the dog 236 is held in this position by the tension of the retractile spring 239 until the pin 246 at the opposite end of the segmental teeth 235 of the plate 234 is brought in contact with the body portion of the dog 236 and returns the body portion of the dog 236 and the end 238 of the spring 239 to the opposite side relative to the pivot point 237 of the dog 236.

A repeat key is provided for repeating any particular value set up on the key board without repeating the depression of the keys corresponding to such value. Such repeat key is indicated at 250 in Figs. 1 and 2, having a cap bearing an appropriate designation. The cap is mounted on its key stem 251 and is tensioned upwardly by its spring 252. The repeat key functions with the releasing mechanism of the keys of the respective banks of the key-board to prevent the normal return of the depressed keys upon the return of the handle from its full stroke position to its normal or initial position. The repeat key 250 is released from its depressed position by the provision of the lever 253, see Fig. 8, pivoted at its one end 254 to a suitable support and at a suitable intermediate point 255 to the lower end of the repeat key stem 251 and is connected at its free end to the slotted link 256 by the pin 257 on the lever 253 received within the opposite closed ended slot 258. The link 256 is pivotally supported at 259 on the lever 260 pivoted at 261 to the angular lever 262 which is pivoted at its fixed end at 263. The tail 264 of the lever 260 is notched at 265 to receive the pin 266 on the angular lever 262 and the retractile spring 267 normally holds the tail 264 of the lever 260 in contact with the pin 266. The lever 262 operates the bell-crank 268 to release the key releasing mechanism as appears hereinafter.

Upon depression of the repeat key 250, the lever 253 is depressed about its pivot 254, causing its pin 257 to engage the lower closed end of the slot 258 and upon further depression of the repeat key 250, the lever 260 is rotated clockwise about its pivot 261, to thereby position the forward notched end 269 of the lever 260 on the curved face 270 on an upwardly curved extension 115 (Fig. 15) of a dollar rod such as the $5 rod 39, whereby upon operation of the handle 11 as aforesaid and the consequent sliding to the left of such dollar rod 39, the notched end 269 engages and retains the extension 115 of such rod 39 and thereby retains all of the dollar rods and of the unit cent and decimal cent rods in their final stage of sliding movement to the left, and upon the repeated depression of the handle 11, a repetition of the actuation of the counters is had.

Upon release of manual pressure on the repeat key 250, the spring 252 of the repeat key stem 251 returns the key 250 and its stem 251 to their normal positions, thereby elevating the lever 253 and its pin 257.

The forward recessed end 269 of the lever 260 is utilized in cooperation with the pin 271 of the arm 272 fixed to and projecting from the shaft 80, upon the return stroke of the handle 11, to operate the key releasing mechanism, thereby restoring the depressed keys to their normally elevated position preparatory for their next operation of the key board.

A simplified form of the mechanism for retaining the depressed keys in their depressed positions is illustrated in the drawings. Its mechanism also precludes the retained depression of any two keys of the same bank.

Referring to Figs. 2 and 8, each key stem 22 is provided with a pin 273 serving on one face of the key stem 22 to anchor the lower end of the spring 274 for returning the key stem to its normal position. The opposite end of the spring 274 is held on the pin 275 fixed to the edge of a suitable upper plate of the frame 17 of the general mechanism.

The opposite side of the pin 273 projects through and beyond the face of the key stem 22 sufficiently to engage the lower edge 276 of the plate 277 pivotally supported at its opposite ends 278, 279 and tensioned by a suitable spring 280 (Fig. 18) to be positioned at an angle to the vertical, the lower edge 276 extending toward and engaging the faces of each key stem of the same bank. Accordingly, upon depression of any key say of the bank 20 of unit cent values, the pin 273 of such depressed key engages the lower portion of the retaining plate 277 of this bank of keys and swings the plate 277 against the action of its spring 280' until the pin 273 is brought below the lower edge 276 of the plate 277, whereupon the spring 280' forces the plate 277 again in contact with the stem of the depressed key but upon the stem 273 and upon release of manual pressure on the depressed key, its spring 274 raises the key stem 22 to bring the pin 273 of the depressed key into contact with the lower edge 276 of the plate 277 thus retaining the depressed key in its depressed position.

In the event that another key of the same bank be depressed, a similar swinging movement of the plate 277 ensues, thus affording the passage of the pin 273 of the previously depressed key stem to be released from contact with the lower edge 276 of the plate 277 whereupon the spring 274 of such previously depressed key restores its key stem to its upper and normal position.

The error key is associated with the key retaining and releasing mechanism, namely by the provision of the key stem 280, see Figs. 1, 2, 8 and 18, mounted similarly to the key stems 22 of the keys of the key board and provided with a similar return spring.

The key stem 280, see Fig. 18, is pivotally secured at its bottom 281 to one arm of the bell crank 282 pivoted at 288, the other arm 284 of the bell crank 282 being provided with the detent 285 for uni-directional operation with the link 286 pivotally supported at its upper end 287 on the pivot pin 288, secured at a suitable location on the frame 17 of the general mechanism. The lower end 290 is pivotally connected to the bar 291 provided at suitable points with the close ended slots 292 corresponding to the four or more banks of keys 20, 23, 24 and 25. The opposite end 293 of the bar 291 is pivotally hung by means of the link 294, supported pivotally at it stop 295 on a pivot pin 296. Each slot 292 of the bar 291 is of sufficient length for receiving the pin 297 of the arm 298 fixed to and projecting from the extension 299 of the retaining plate 277 of the bank of keys to thereby permit the free movement of the retaining plate 277 in its key retaining operation without disturbance of the bar 291. Normally each pin 297 of the arm 298 of each key retaining plate 277 is in engagement with a face of a slot 292, whereby upon depression of the key stem 280 and consequent swinging of the bar 291 toward the right as viewed from the position of the operator, the pins 297 of the respective plates 277 engage the closed end of the slots of the bar 291 and are oscillated in counterclockwise direction to swing the plates 277 outwardly from the key stems of the respective banks and accordingly release the depressed keys. Accordingly, upon depression of the error key 280, the pin 283 is moved toward the link 287 to contact therewith, thereby serving as a driver to shift the frame 291 and thereby release any depressed keys. The return of the frame 291 to its neutral position, as shown in Fig. 18, is attained by the summation of the forces of the springs 280, 280', for returning the respective key-retaining plates 277, whereby a corresponding force is exerted on the respective pins 297 and thereby on the frame 291.

The release of the depressed keys automatically upon the return stroke of the handle 11 is effected, as aforesaid, by the arm 272 (Fig. 8) engaging by its pin 271 the notched forward end 269 of the lever 260, thereby swinging the lever 260 about its pivot 261, to cause the notch 265 of its tail 264 to engage the pin 266 of the lever 262 thereby bodily raising the lever 262 into contact with the free arm of the bell crank 268. The opposite arm of the bell crank 268 is pivotally connected at 300ª to the bar 291, causing the bar to swing to the right as viewed by the operator and in a similar manner swinging the plates 277 of the respective banks of keys to release the key stems of the depressed keys. A spring 274a effects return of the detent 282.

In the stage of the depression of the handle 11 and consequent rotation of the arm 272, its pin 271 encounters the forward end of the lever 260 without effect, namely swinging the lever 260 about its pivot 261 and tensioning the spring 267, thereby enabling the clearing of the pin 271 of the forward end of the lever 260, and thereupon the spring 267 returns the lever 260 to its normal position, namely by the notch 265 of its tail 264 being brought into engagement with the pin 266 by the spring 267.

The operations of the respective mechanisms of the type of calculating machine illustrated in the drawings will be clear from the above detail description of the respective parts. These respective mechanisms connote improvements in calculating machines generally and in denominator machines specifically.

The mechanism comprising the rods or equivalent elements which are displaceable in correspondence to the values to be respectively transferred by such rods effects the transfer of the values inversely in proportion to the magnitude of the values. For a zero indication of a counter, that is to say, the non-operation of the counter, its rod is displaced through its maximum range of movement. For the transfer of the maximum value of any particular rod to its counter such rod is subject to its minimum displacement and as in the embodiment illustrated in the drawings may be subject to a zero displacement.

Co-operating with such displaceable rods for use in calculating machines generally, there is arranged as in the above illustrated denominator machine a rack corresponding to each rod, the effective number of teeth of which is varied pursuant to the value to be transferred by the rod through the rack to the counter directly or indirectly through suitable coacting parts. The feature of the uniform stroke of the slide member of the rack simplifies the connection between the rack and its actuating means and the movement of the variable teeth to and from their respective operative positions is controlled directly or indirectly by the extent of displacement of the controlling rod.

The coupling by common links of two or more rods which are displaceable in correspondence to numerical values simplifies the mechanism for displacing such rods and at the same time enables each rod to transfer independently of other rods the value to be transferred to its counter.

A further feature of my invention is the provision of the setting of the stop elements by a movement independently of and free from contact with the respective displaceable rods or equivalent whereby the stop elements and their associated levers, springs and the like are operated with full freedom of movement, thereby eliminating friction and undue wear of the parts and the free flexing of the springs.

It will be noted that my invention provides for the setting of positive stops respectively for the displacement rods or equivalent, thereby insuring a prescribed and definite movement of the variably displaceable rods or equivalent for each and every variable value transferred by the displaceable rods or equivalent.

My invention is applicable to denominator machines and other types of calculating machines wherein the key board is replaced by mechanism responsive to variable numerical values such as pneumatic and other mechanical or electrical mechanisms for receiving cards or the equivalent which are punched or otherwise bear indicia corresponding to monetary or other numerical values and arranged to correspondingly operate the stop elements or equivalent of my calculating machine.

If desired, the counters of the various denominations may be associated with a counter showing the total intrinsic value of the items to which the key board has been operated, as in my aforesaid Patent No. 1,476,804 and a printing device may be employed in association with the operation of the denomination counters or the total value counters similarly as in my aforesaid patents.

Whereas, I have described my invention by reference to specific forms thereof, it will be understood that many changes and modifications may be made without departing from the spirit of the invention.

I claim:

1. In a machine of the character described, the combination with a keyboard, of a bar corresponding to a monetary value, a shaft, said bar being normally positioned for maximum displacement for a given operation of said shaft, means connecting the keys of said keyboard with said bar for changing the setting position of said bar to an extent corresponding to the difference in numerical value represented by the normal position of said bar and the numerical value of the depressed key, a counter, and means operated by said shaft and controlled by said bar for operating said counter in correspondence to the numerical value of the operated key of said keyboard, said counter-operating means comprising a member reciprocated by said shaft, a plurality of operating elements movably mounted on said member, and means co-acting with said bar for controlling the number of said operating elements in effective position for moving said counter.

2. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a horizontal reciprocable variable rack member having vertically movable teeth elements, and means connecting said bar with said movable teeth elements for moving said movable teeth elements into and out of operative position relative to said counter.

3. In a machine of the character described, the combination of a keyboard, a counter, a bar normally set in position to effect maximum operation of said counter, means connecting said bar with the respective keys of said keyboard for changing the set position of said bar to an extent corresponding to the difference in numerical value between that represented by the normal position of said bar and the numerical value of the operated key, a shaft, and means operated by said shaft and controlled by said bar for variably operating said counter in correspondence to the numerical value of the operated key.

4. In a machine of the character described, the combination of a keyboard, a counter, a bar normally set in position to effect maximum operation of said counter, means connecting said bar with the respective keys of said keyboard for changing the set position of said bar to an extent corresponding to the difference in numerical value between that represented by the normal position of said bar and the numerical value of the operated key, a shaft, and means operated by said shaft and controlled by said bar for variably operating said counter in correspondence to the numerical value of the operated key, said variably operating means including a rack member having variable effective rack teeth.

5. In a machine of the character described, the combination of a keyboard, a counter, a bar normally set in position to effect maximum operation of said counter, means connecting said bar with the respective keys of said keyboard for changing the set position of said bar to an extent corresponding to the difference in numerical value between that represented by the normal position of said bar and the numerical value of the operated key, a shaft, and means operated by said shaft and controlled by said bar for variably operating said counter in correspondence to the numerical value of the operated key, said variably operating means including a rack member having variable effective rack teeth.

6. In a machine of the character described, the combination of a keyboard, a counter, a bar normally set in position to effect maximum operation of said counter, means connecting said bar with the respective keys of said keyboard for changing the set position of said bar to an extent corresponding to the difference in numerical value between that represented by the normal position of said bar and the numerical value of the operated key, a shaft, and means operated by said shaft and controlled by said bar for variably operating said counter in correspondence to the numerical value of the operated key, said variably operating means including a rack member having variable effective rack teeth, said rack member comprising a frame and a plurality of movably mounted teeth members.

7. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a variable rack member having spring urged movable teeth elements, stop means co-acting with said spring urged movable teeth elements, and means connecting said bar with said movable teeth elements for moving said movable teeth elements into and out of operative position relative to said counter.

8. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a reciprocating variable rack member having teeth elements movable transversely to the direction of reciprocation of said rack member, means for movably mounting said rack member, and means connecting said bar with said movable teeth elements for moving said movable teeth elements into and out of operative position relative to said counter.

9. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a variable rack member having movable teeth elements, means for movably mounting said rack member and means connecting said bar with said movable teeth elements for moving said movable teeth elements into and out of operative position relative to said counter.

10. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a variable rack member having spring urged movable teeth elements, stop means co-acting with said spring urged movable teeth elements, means for movably mounting said rack member, and means connecting said bar with said movable teeth elements for moving said movable teeth elements into and out of operative position relative to said counter.

11. In a machine of the character described, the combination with a keyboard, of a bar corresponding to a monetary value, a counter, a shaft, and means operated by said shaft and controlled by said bar for operating said counter in correspondence to the numerical value of the operated key of said keyboard, said counter-operating means including a variable rack member having spring urged movable teeth elements, stop means co-acting with said spring urged movable teeth elements, means for movably mounting said rack member and means connecting said bar with said movable teeth elements for moving said movable teeth elements into and out of operative position relative to said counter.

12. In a machine of the character described, the combination with a keyboard, of a plurality of bars corresponding to different monetary values, a group of counters, a shaft, and means operated by said shaft and respectively controlled by said bars for operating said counters respectively in correspondence to the numerical values of the operated keys of said keyboard, said counter-operating means comprising a member for each counter, individual means operated by said shaft and respectively controlled by said bars for actuating said counters in correspondence to the numerical values of the operated keys of said keyboard, each of said counter-operating means including a rack member, means for movably mounting said rack member, spring urged rack teeth elements movably mounted on said rack member, stop elements respectively for said movable rack teeth elements, and link means connecting said rack member with its bar for oscillating said rack member and thereby control the number of rack teeth elements effectively actuating its counter.

13. In a machine of the character described, the combination with a keyboard, of a bar corresponding to a monetary value, a shaft, said bar being normally positioned for maximum displacement for a given operation of said shaft, means connecting the keys of said keyboard with said bar for changing the setting position of said bar to an extent corresponding to the difference in numerical value represented by the normal position of said bar and the numerical value of the depressed key, a counter, and means operated by said shaft and controlled by said bar for operating said counter in correspondence to the numerical value of the operated key of said keyboard.

In testimony whereof I have signed this specification this 20th day of May 1925.

MICHELE GUGLIELMO DE SIMONE.